(12) United States Patent
Lai et al.

(10) Patent No.: US 9,418,409 B2
(45) Date of Patent: Aug. 16, 2016

(54) IMAGE RECOVERY METHOD

(71) Applicants: Yi-Shuan Lai, Taichung (TW); Yi-Lei Chen, New Taipei (TW); Chiu-Ting Hsu, Hsinchu County (TW)

(72) Inventors: Yi-Shuan Lai, Taichung (TW); Yi-Lei Chen, New Taipei (TW); Chiu-Ting Hsu, Hsinchu County (TW)

(73) Assignees: NOVATEK Microelectronics Corp., Hsin-Chu (TW); Tsing Hua University, Hsin-Chu (TW)

( * ) Notice: Subject to any disclaimer, the term of this patent is extended or adjusted under 35 U.S.C. 154(b) by 185 days.

(21) Appl. No.: 14/133,674

(22) Filed: Dec. 19, 2013

(65) Prior Publication Data

US 2014/0254931 A1    Sep. 11, 2014

(30) Foreign Application Priority Data

Mar. 6, 2013    (TW) .............................. 102107882 A

(51) Int. Cl.
*G06K 9/00*    (2006.01)
*G06T 5/20*    (2006.01)
*G06T 5/00*    (2006.01)

(52) U.S. Cl.
CPC . *G06T 5/20* (2013.01); *G06T 5/003* (2013.01); *G06T 2207/10024* (2013.01)

(58) Field of Classification Search
USPC .................................................. 382/167, 274
See application file for complete search history.

(56) References Cited

U.S. PATENT DOCUMENTS

| 8,755,628 | B2* | 6/2014 | Fang ....................... G06T 5/009 382/274 |
| 8,970,691 | B2* | 3/2015 | Omer ...................... G06T 5/008 345/419 |
| 2010/0259651 | A1* | 10/2010 | Fattal ...................... G06T 5/003 348/241 |
| 2011/0188775 | A1* | 8/2011 | Sun .......................... G06K 9/40 382/274 |
| 2012/0023456 | A1 | 1/2012 | Sun |

FOREIGN PATENT DOCUMENTS

CN    102063706 B    8/2012

* cited by examiner

*Primary Examiner* — Yon Couso
(74) *Attorney, Agent, or Firm* — Winston Hsu; Scott Margo

(57) ABSTRACT

An image recovery method is disclosed for eliminating an effect of an environmental medium. The image recovery method includes receiving a captured image affected by the environmental medium, defining a respective local window with each pixel located at a center of the respective local window, and under an assumption that original radiance of all pixels within the respective local window in the captured image are identical, performing a minimization calculation for each local window, to obtain a corresponding transmission of each pixel in the captured image.

14 Claims, 13 Drawing Sheets
(5 of 13 Drawing Sheet(s) Filed in Color)

$E1(x, y)$ $\alpha(x, y)$ $R(x, y)$ $E2(x, y)$ $\alpha(x, y)$ $R(x, y)$ $\alpha(x, y)$ $R(x, y)$ $R(x, y)$ $R(x, y)$

IMAGE RECOVERY METHOD

BACKGROUND OF THE INVENTION

1. Field of the Invention

The present invention relates to an image recovery method, and more particularly, to an image recovery method capable of estimating a corresponding transmission of each pixel, so as to recover an image by an accurate transmission map.

2. Description of the Prior Art

Generally, a captured image obtained from an image capturing device is affected by haze in an environment full of haze. The farther the object is, the less visible it shows. Therefore, dehazing is required to obtain the real image which is unaffected by haze.

In the prior art, there are mainly three dehazing methods. The first method requires multiple captured images which are taken in different specific environments (e.g. the environments with dense haze, thin haze and no haze), so as to estimate the real image without the effect of haze. The practicability of this method is limited because obtaining the multiple images is usually difficult. The second method requires an apparatus or a user to approximate the depth information of given images (e.g. a distance of each targeted object) before the dehazing process, which is not easy to implement in practice either. The third method makes assumptions of latent variables, such as radiance, distance or airlight of the object, on single image in order to derive an optimal solution.

However, the third conventional method tends to achieve a rough estimate (i.e., a local optimal solution) on large-scale areas because their assumptions usually fail to characterize the fine-grained details of transmission. For those small-scale areas, the derived transmission becomes rougher, and therefore, the dehazing effect is not accurate (e.g. as shown in FIG. 1, a transmission map obtained by the local optimal solution of the conventional method is very vague). Besides, in the conventional method, attenuation coefficients of a red color channel, a green color channel and a blue color channel are an identical constant value. However, the attenuation coefficients of the red, green and blue color channels are not the same in response to haze in reality. Therefore, the radiance of the image does not conform to the real radiance of the object after dehazing. Thus, there is a need for improvement of the prior art.

SUMMARY OF THE INVENTION

It is therefore an objective of the present invention to provide an image recovery method capable of estimating a corresponding transmission of each pixel, so as to recover an image by an accurate transmission map.

The present invention discloses an image recovery method for eliminating an effect of an environmental medium, including receiving a captured image affected by the environmental medium; defining a respective local window with each pixel located at a center of the respective local window; and under an assumption that original radiance of all pixels within the respective local window are identical, performing a minimization estimation for each local window, to obtain a corresponding transmission of each pixel in the captured image.

The present invention further discloses an image recovery method for eliminating an effect of an environmental medium, including receiving a captured image affected by the environmental medium; obtaining a transmission heuristic of the captured image; calculating a transmission corresponding to each pixel in the captured image constrained by the transmission heuristic; and deriving original radiance of each pixel without the effect of the environmental medium according to the captured image and the transmission of each corresponding pixel.

The present invention further discloses an image recovery method for eliminating an effect of an environmental medium, including receiving a captured image affected by the environmental medium; calculating a transmission corresponding to each pixel in the captured image by assuming that transmissions of different color channels have different attenuation coefficients; and deriving original radiance of each pixel without the effect of the environmental medium according to the captured image and the transmission of each corresponding pixel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

DETAILED DESCRIPTION

Figure 2:
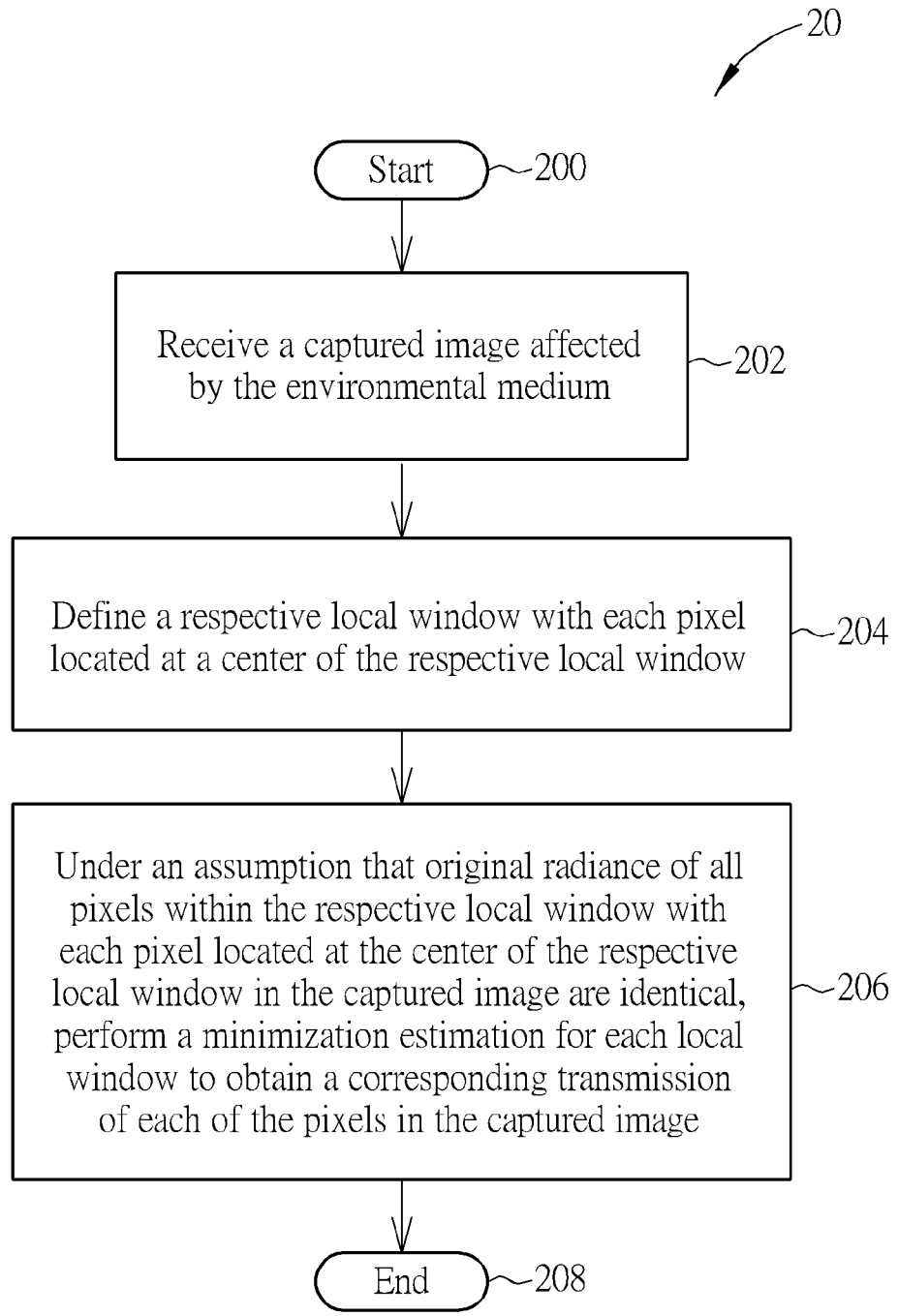
FIG. 2 is a flow diagram of an image recovery process according to an embodiment of the present invention.

Please refer to FIG. 2, which is a schematic diagram of an image recovery process 20 according to an embodiment of the present invention. As shown in FIG. 2, the image recovery process 20 is used in an image processing device for eliminating an effect of an environmental medium (e.g. for a real-time processing in a camera or a cell phone, or a post-processing in a computer, to eliminate the effect of the environmental medium such as haze or smog). The image recovery process 20 includes the following steps:

Step 200: Start.

Step 202: Receive a captured image affected by the environmental medium.

Step 204: Define a respective local window with each pixel located at a center of the respective local window.

Step 206: Under an assumption that original radiance of all pixels within the respective local window are identical, perform a minimization estimation for each local window to obtain a corresponding transmission of each of the pixels in the captured image.

Step 208: End.

According to the image recovery process 20, the image processing device receives a captured image affected by the environmental medium (e.g. an image taken by a camera or a cell phone in haze or smog), and then defines a respective local window with each pixel located at a center of the respective local window (e.g. windows of 3×3 pixels centered by each respective pixel). Next, under an assumption that original radiances of all pixels within the respective local window are identical (i.e. radiances of all pixels corresponding to an object in the local window should be identical), the image processing device performs a minimization estimation for each local window to obtain a corresponding transmission of each of the pixels in the captured image. After that, the image processing device derives the original radiance of each of the pixels without the effect of the environmental medium according to the captured image and the corresponding transmission of each of the pixels. As a result, the embodiment assumes that the original radiances of all pixels in the local window of each of the pixels are identical to derive each transmission of each of the pixels, so as to obtain a transmission map with a global optimal solution and thereby recover the image with the accurate transmission map.

In detail, the captured image affected by the environmental medium can be expressed by the following mathematical model:

$$E(x, y) = R(x, y)e^{-\beta d(x,y)} + L_\infty(1 - e^{-\beta d(x,y)}) \quad (1)$$
$$= R(x, y)\alpha(x, y) + L_\infty(1 - \alpha(x, y))$$

wherein $E(x, y)$ represents the captured image observed (or taken) by the device, $\beta$ is the atmospheric attenuation coefficient, $L_\infty$ is the radiance of the environmental medium (assuming the radiance is white if the environmental medium is haze), $d(x, y)$ is the distance from each object in the field to a camera lens, $R(x, y)$ is the original radiance of each of the pixels without the effect of the environmental medium, and $\alpha(x, y)$ is defined as $e^{-\beta d(x,y)}$ and is called transmission.

In other words, equation (1) shows that the captured image $E(x, y)$, includes a direct attenuation component and an airlight component. The direct attenuation component represents the light successfully transmitted from an object to the camera, which is determined by the original radiance $R(x, y)$ of each pixel without the effect of the environmental medium and the transmission $\alpha(x, y)$, and the airlight component represents the radiance of the environmental medium reflecting sunlight to the camera lens, which is determined by the radiance $L_\infty$ of the environmental medium and the transmission $\alpha(x, y)$. Noticeably, other embodiments may utilize different mathematical models and are not limited to equation (1).

In such a condition, the radiance $L_\infty$ of the environmental medium in general can be obtained from experiments, and therefore the transmission $\alpha(x, y)$ and the original radiance $R(x, y)$ of each of the pixels without the effect of the environmental medium need to be solved. Thus, equation (1) is modified as below:

$$\alpha(x, y) = \frac{1}{R(x, y) - L_\infty}[E(x, y) - L_\infty] \quad (2)$$
$$= \gamma(x, y)[E(x, y) - L_\infty]$$

where $\gamma(x, y)$ is called a capturing function, which is determined by the original radiance $R(x, y)$ and the radiance $L_\infty$ of the environmental medium. Assuming that the original radiance $R(x, y)$ of the object is a constant within a small local window w (i.e. the radiances of the object corresponding to all pixels within the local window are identical), the capturing function $\gamma(x, y)$ is therefore a constant:

$$\alpha_i = \gamma[E_i - L_\infty], \forall i \in w \quad (3)$$

Next, from the equation (3) derived by assuming radiances of all pixels inside the local window centered by each pixel are all identical in the captured image $E(x, y)$, the embodiment defines a cost function $J(\alpha,\gamma)$ according to the captured image $E(x, y)$, the radiance $L_\infty$ of the environmental medium, the original radiance $R(x, y)$ without the effect of the environmental medium and the transmission $\alpha(x, y)$ of each pixel. Afterward, the embodiment derives the transmission $\alpha(x, y)$ and original radiance $R(x, y)$ that minimize the cost function $J(\alpha,\gamma)$, as illustrated below:

$$J(\alpha, \gamma) = \sum_{j \in E} \left( \sum_{i \in w_j} (\alpha_i - \gamma_j[E_i - L_\infty])^2 + (\varepsilon \gamma_j)^2 \right) \quad (4)$$

$$= \sum_k \left\| \begin{bmatrix} \alpha_{i_1} \\ \vdots \\ \alpha_{i_{|w_k|}} \\ 0 \end{bmatrix} - \begin{bmatrix} E_{i_1} - L_\infty \\ \vdots \\ E_{i_{|w_k|}} - L_\infty \\ \varepsilon \end{bmatrix} \gamma_k \right\|^2$$

$$= \sum_k \| z_k \gamma_k - \overline{\alpha}_k \|^2$$

where $w_j$ represents all of the pixels inside the local window which is centered by the jth pixel. The cost function $J(\alpha,\gamma)$ calculates the square error of the difference between a left item and a right item of equation (3), and $\epsilon$ is a regularization parameter optionally introduced into the cost function $J(\alpha,\gamma)$ for preventing the constant value $\gamma$ of the capturing function $\gamma(x, y)$ from being an extreme value during minimization.

As a result, this embodiment encourages that all the original radiances of all the pixels inside the local window centered by each pixel in captured image $E(x, y)$ are identical as the equation (3), then calculates each transmission by minimizing the cost function $J(\alpha,\gamma)$ with respect to each pixel of respective local window with the equation (6), and substitutes the each transmission back to the equation (1) to obtain the original radiance $R(x, y)$ without the inclusion of the environmental medium effect.

In such a condition, the embodiment can assume the transmission $\overline{\alpha}_k$ is already given so that the optimal solution for the capturing function $\gamma_k$ with respect to each local window $w_k$ is:

$$\gamma_k^* = \underset{\gamma_k}{\operatorname{argmin}} \sum_k \| z_k \gamma_k - \overline{\alpha}_k \|^2 = (z_k^T z_k)^{-1} z_k^T \overline{\alpha}_k \quad (5)$$

Therefore the embodiment substitutes the equation (5) to the equation (4) to derive:

$$J(\alpha) = \sum_k \bar{\alpha}_k^T A_k^T A_k \bar{\alpha}_k = \alpha^T U \alpha \qquad (6)$$

Wherein $A_k = I - z_k(z_k^T z_k)^{-1} z_k^T$ and U is the Laplacian matrix as illustrated below:

$$U(i,j) = \sum_{k|(i,j)\in w_k} \delta_{ij} - \left( b_{ij} \left( \sum_n^{|w_k|} (E_n - L_\infty)^2 + \varepsilon^2 \right)^{-1} \right) \qquad (7)$$

Wherein $$b_{ij} = (E_i E_j - E_i L_\infty - E_j L_\infty + L_\infty^2)$$

$$\delta_{ij} = \begin{cases} 1 & \text{if } i = j \\ 0 & \text{otherwise} \end{cases}$$

Besides, to prevent the original radiance R(x, y) from being negative, the embodiment includes a constraint $$\alpha_j \geq \frac{(L_\infty - E_j)}{L_\infty}$$

derived by using the transmission α(x, y) to represent the original radiance R(x, y) in the equation (2). Moreover, to ensure the transmissions α(x, y) of the same object being consistent, the embodiment defines a smooth function $\zeta \|\nabla \alpha\|^2$ according to a smooth parameter ζ and the transmission α(x, y), wherein the smooth parameter ζ defines the smooth level of the transmission α(x, y), and then introduces the smooth function $\zeta \|\nabla \alpha\|^2$ into the cost function J(α,γ). Therefore, the equation (6) can be modified as follows:

$$J(\alpha) = \alpha^T U \alpha + \zeta \|\nabla \alpha\|^2 \text{ s.t. } \frac{(L_\infty - E_j)}{L_\infty} \leq \alpha_j \leq 1, \forall j \in E \qquad (8)$$

As a result, the constraint introduced by the equation (8) can prevent the error induced by negative radiance R(x, y), and also find a better resolution of more smooth and continuous transmission α(x, y) for image recovery.

Figure 1:
FIG. 1 is a diagram of a transmission obtained by a local optimal solution of a conventional method.
Figure 3A:
FIG. 3A to 3C are diagrams of a captured image and a transmission and an original radiance derived from a cost function, respectively.
Figure 3B:
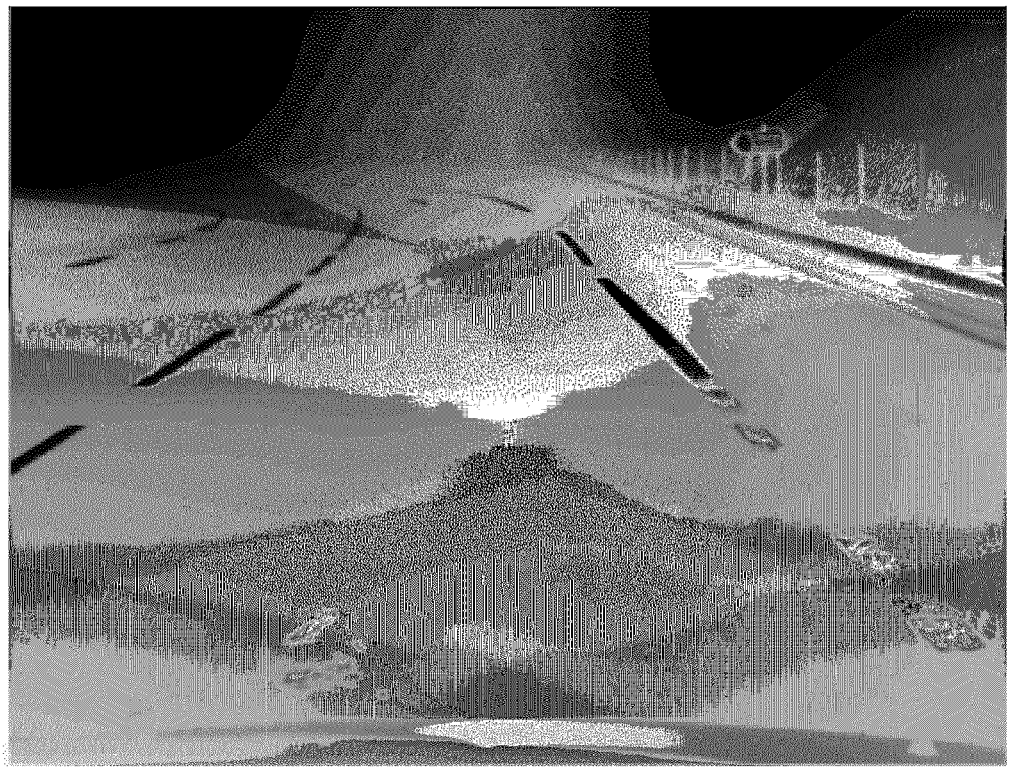
Figure 3C:

For example, please refer to FIG. 3A to FIG. 3C, which are schematic diagrams of a captured image E1(x, y), the transmission α(x, y) and the original radiance R(x, y) derived by equation (6) or equation (8), respectively. As shown in FIG. 3A to FIG. 3C, the captured image E1(x, y) becomes vague due to the effect of the environmental medium (such as haze) in FIG. 3A. After the optimal resolution of each transmission α(x, y) of the respective pixels in FIG. 3B is derived from equation (6) or equation (8) (the resulted transmission α(x, y) is finer than the transmission in FIG. 1), the embodiment can perform image recovery to derive the accurate original radiance R(x, y) as shown in FIG. 3C.

Noticeably, the main spirit of the above embodiments is to assume the original radiances of all pixels in the local window centered by each respective pixel are identical for deriving the transmission map with a global optimal solution, so as to recover images by the accurate transmission map. Those skilled in the art can make modifications and alterations accordingly. For example, the above equations are used for calculating the transmission α(x, y) and the original radiance R(x, y) of each pixel in gray-level. Given a color image with three color channels, since the distances d from the object to the camera lens are the same, one can assume that the transmissions of three color channels are identical to rewrite equation (3) as:

$$\alpha_i \approx \gamma^c [E_i^c - L_\infty^c], \forall i \in w, \forall c \in \{r,g,b\} \qquad (9)$$

where c represents the color channel, r represents the red color channel, g represents the green color channel, and b represents the blue color channel.

In such a condition, the cost function J(α,γ) in equation (4) can be modified as:

$$J(\alpha, \gamma) = \sum_c \sum_{j\in E} \left( \sum_{i\in w_j} (\alpha_i - \gamma_j^c [E_i^c - L_\infty^c])^2 + (\varepsilon \gamma_j^c)^2 \right) \qquad (10)$$

$$= \sum_k \left\| \begin{bmatrix} I_{|w_k|\times|w_k|} & 0 \\ I_{|w_k|\times|w_k|} & \vdots \\ I_{|w_k|\times|w_k|} & \vdots \\ 0 & 0 \end{bmatrix} \begin{bmatrix} \alpha_{i_1} \\ \vdots \\ \alpha_{i_{|w_k|}} \\ 0 \end{bmatrix} - \begin{bmatrix} t_k^r & & \\ & t_k^g & \\ & & t_k^b \\ \varepsilon & & \\ & \varepsilon & \\ & & \varepsilon \end{bmatrix} \begin{bmatrix} \gamma_k^r \\ \gamma_k^g \\ \gamma_k^b \end{bmatrix} \right\|^2$$

$$= \sum_k \|Z_k \gamma_k - Q\bar{\alpha}_k\|^2$$

Then, similar to equation (5) which assumes $\bar{\alpha}_k$ is already given, the embodiment derives the optimal solution for the capturing function $\gamma_k^c$ with respect to each local window $w_k$ and substitute the optimal solution to the equation (10). Equation (10) is therefore rewritten as below:

$$J(\alpha) = \sum_k \bar{\alpha}_k^T \bar{A}_k^T \bar{A}_k \bar{\alpha}_k = \alpha^T U \alpha \qquad (11)$$

where $A_k = Q - Z_k(Z_k^T Z_k)^{-1} Z_k^T Q$.

Figure 4A:
FIG. 4A to 4C are diagrams of another captured image and a transmission and an original radiance derived from a cost function, respectively.
Figure 4B:
Figure 4C:
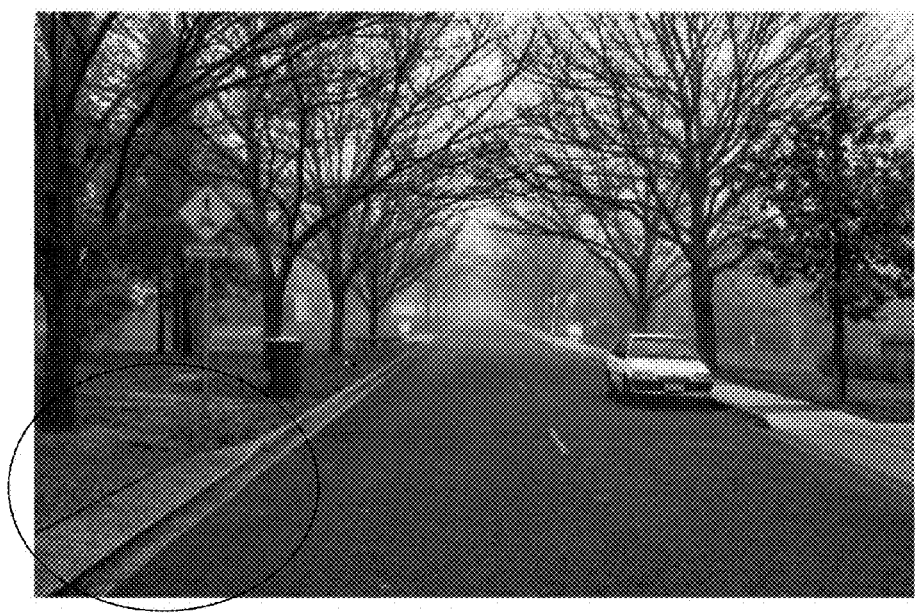

For example, please refer to FIG. 4A to FIG. 4C, which are schematic diagrams of another captured image E2(x, y), and the transmission α(x, y) and the original radiance R(x, y) derived from equation (11). As shown in FIG. 4A to FIG. 4C, the captured color image E2(x, y) shown in FIG. 4A is vague due to the effect of the environmental medium (e.g. haze). After the optimal solution of each transmission α(x, y) of each pixel shown in FIG. 4B is derived from equation (11), the image can be recovered to obtain the accurate original radiance R(x, y) shown in FIG. 4C.

Besides, as the white car shown in FIG. 4B, the derived transmission of a white object may be smaller than the real transmission due to the nature characteristic of the dehazing mathematical model (The radiance of the object of the captured image is substantially equal to the radiance $L_\infty$ of the environmental medium, i.e. $E \approx L_\infty$, so $\alpha \approx 0$ is derived). On the contrary, the derived transmission of a black object may be larger than the real transmission as the shadow under the car shown in FIG. 4B (Since the radiance of the captured image is substantially equal to the original radiance, i.e. $E \approx R \approx 0$, $\alpha \approx 1$ is derived.)

In order to prevent the radiance-dependent distortion of the transmission α(x, y), a transmission heuristic of the captured image E(x, y) can be obtained first so that a heuristic bound $h_j$ can be used to guide the estimation of the transmission α(x, y) when minimizing the cost function J(α,γ).

Figure 5:
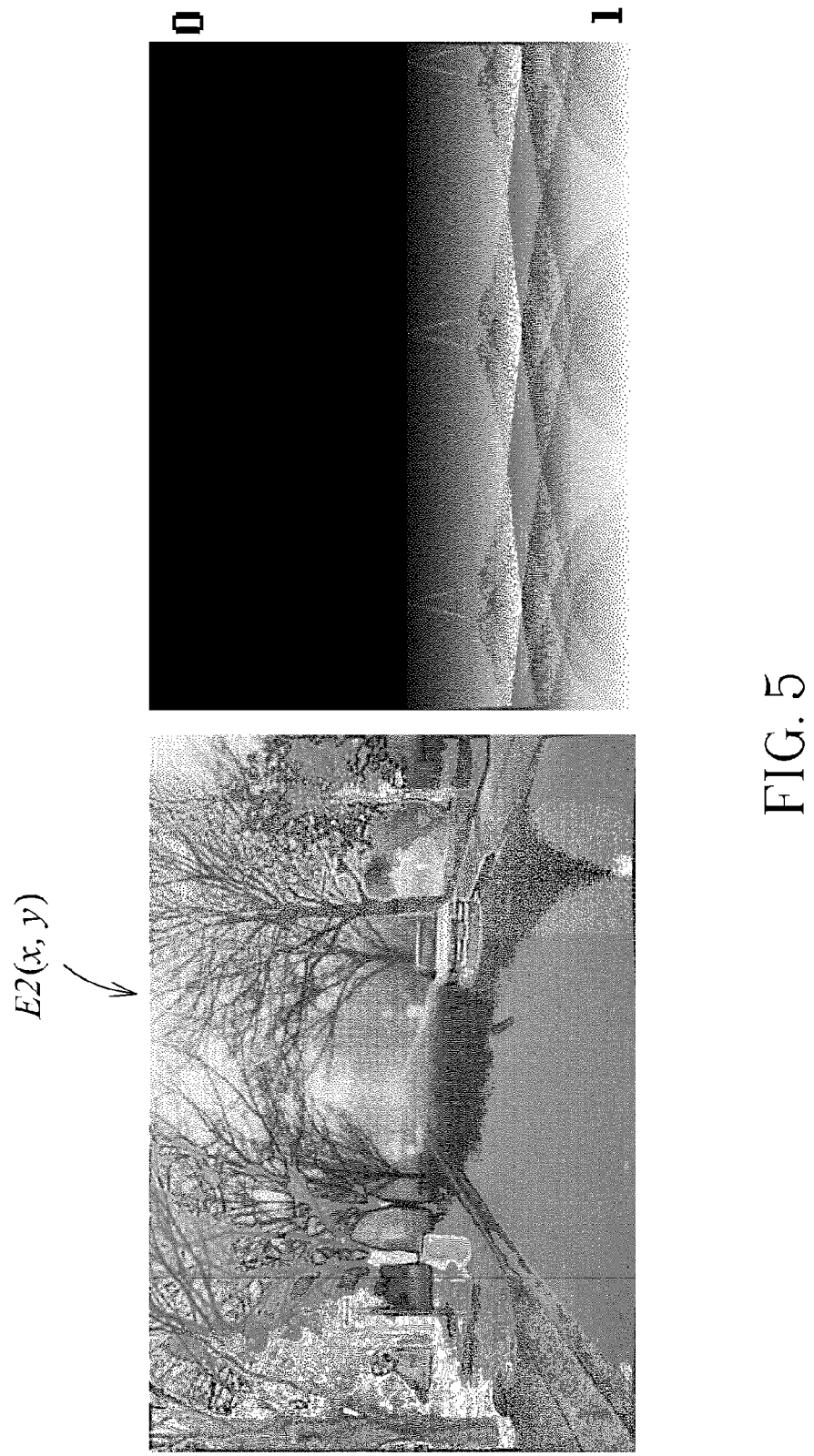
FIG. 5 is a diagram of the captured image shown in FIG. 4 and the transmission heuristic thereof.

In detail, please refer to FIG. 5, which is a diagram of the captured image E2 (x, y) shown in FIG. 4A and the transmission heuristic thereof. As shown in the right side of FIG. 5, since a depth d increases from the camera lens to the horizontal line where the sky meets the ground, the transmission α(x, y) increases from the horizon line to the camera lens logarithmically. If a horizon line in the captured image E(x, y) can be obtained, the embodiment can set the transmission heuristic of a non-ground part in the captured image E(x, y) as a first fixed value and set the transmission heuristic of a ground part in the captured image E(x, y) from far to near as a value from the first fixed value to a second fixed value (e.g. from 0 to 1) according to the horizon line. The transmission heuristic of the ground part in the captured image E(x, y) from far to near can be further set as a value with logarithmic increase. After that, the embodiment sets the transmission heuristic of the same object in the captured image E(x, y) to be less than or equal to a transmission heuristic at a lowest point of the object. Note that the above constraint for the transmission heuristic is only illustrated for example. In different applications, different transmission heuristics can be designed for different requirements.

In such a condition, a greater value of the transmission may be taken from an estimated result of performing the minimization estimation for each local window and a transmission value of each corresponding pixel in the transmission heuristic to be the transmission α(x, y) of each corresponding pixel in the captured image E(x, y) (i.e. in reality, the transmission should be equal to or larger than the transmission heuristic of a spatial distribution.) Therefore, equation (8) can be rewritten as below:

$$J(\alpha) = \alpha^T U \alpha + \zeta \|\nabla \alpha\|^2 \text{ s.t. } \max\left(h_j, \frac{(L_\infty - E_j)}{L_\infty}\right) \leq \alpha_j \leq 1, \quad (12)$$
$$\forall j \in E$$

where $h_j$ is a lower bound of the transmission and is called transmission heuristic, $$\frac{(L_\infty - E_j)}{L_\infty}$$

ensures that the original radiance without haze is not negative, and ζ is a parameter to control a degree of smoothness. In other embodiments, the transmission is not restricted to be a greater value, and, for example, it may be calculated from weighting.

Figure 6A:
FIG. 6A to 6B are diagrams of a transmission and an original radiance of the captured image shown in FIG. 4 derived by a cost function, respectively.
Figure 6B:
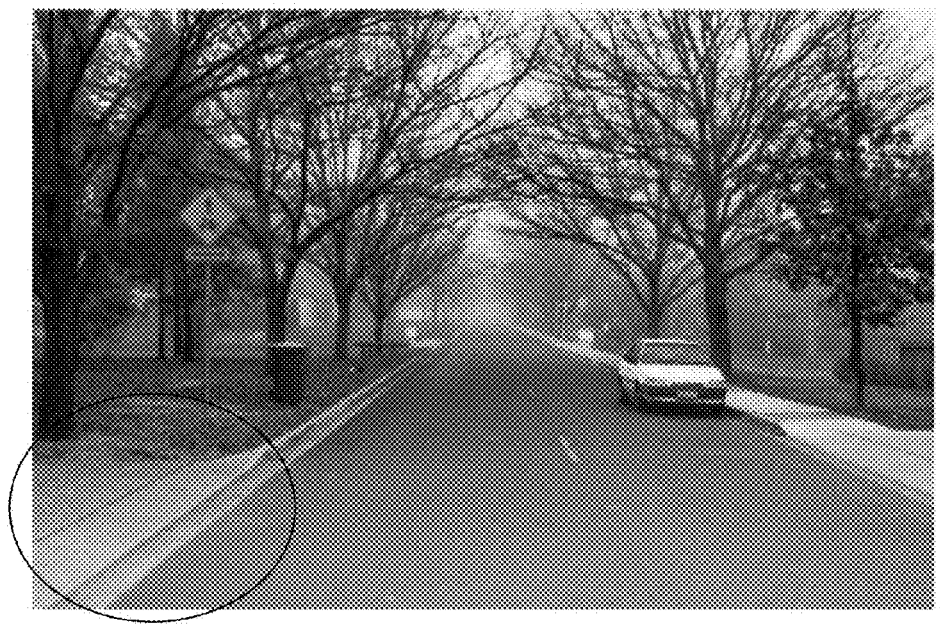

As a result, please refer to FIG. 6A to FIG. 6B, which are diagrams of the transmission α(x, y) and the R(x, y) of the captured image E2 (x, y) derived from equation (11). As can be seen by comparing FIG. 6A to FIG. 6B constrained by the transmission heuristic and FIG. 4B to FIG. 4C without using the transmission heuristic, the white car and the white road in the bottom left in FIG. 4B show that the derived transmission is smaller than the real transmission because of the white color, and the white car and the white road in the bottom left in FIG. 6B show that the transmission matching the spatial distribution can be derived by using the transmission heuristic, such that the radiance close to the real radiance can be derived.

Besides, the above image recovery embodiments set the attenuation coefficients of the transmission of different color channels to be identical. However, since the environmental medium causes lights with different wavelengths to have different transmission, a color shift may occur and the original radiance R(x, y) obtained tends to be greener if different color channels are set to have identical coefficients. In such a condition, different coefficients can be set for the transmissions of different color channels to correct the effect of the environmental medium.

Figure 7A:
FIG. 7A is a diagram of an original radiance obtained by setting attenuation coefficients of different color channels to be an identical value for a further captured image.
Figure 7B:
FIG. 7B is a diagram of an original radiance obtained by setting attenuation coefficients of different color channels to be different values for a further captured image.

For example, please refer to FIG. 7A and FIG. 7B. FIG. 7A is a diagram of an original radiance R(x, y) obtained by setting attenuation coefficients of different color channels to be an identical value for a captured image E3 (x, y), and FIG. 7B is a diagram of an original radiance R(x, y) obtained by setting attenuation coefficients of different color channels to be different values for a captured image E3(x, y). As shown in FIG. 7A and FIG. 7B, the original radiance R(x, y) obtained in FIG. 7A is greener, and the original radiance R(x, y) obtained in FIG. 7B is more close to the radiance of the real object (the radiance of the brick wall is more close to the real red color) since it assumes the environmental medium is haze and sets the attenuation coefficients of the red color channel, the green color channel and the blue color channel to substantially equal to 0.83, 0.93 and 0.95, respectively. Note that different values of attenuation coefficients may be used for different color channels according to different requirements in other embodiments, and are not restricted to the above values.

Noticeably, in the above embodiments, the limitation $$\alpha_j \geq \frac{(L_\infty - E_j)}{L_\infty}$$

which prevents the original radiance R(x, y) from being a negative value, the smooth function $\zeta \|\nabla \alpha\|^2$ which performs smoothing, the bound $h_j$ of the transmission heuristic and the application which sets different color channels to have different attenuation coefficients are combined for implementation in order to obtain the transmission α(x, y) and original radiance R(x, y) corresponding to each pixel. However, in other embodiments, the above limitations, constraints, and/or assumptions can be separately implemented or partially combined to maintain respective effects thereof.

To sum up, in the prior art, the first kind of the conventional methods for dehazing requires multiple captured images taken in different specific environments, which is more complicated and difficult when obtaining the captured images. The second kind of the conventional methods requires an apparatus or a user to obtain depth information of the image and is also difficult to be implemented in practice. The third kind of the conventional methods utilizes a single image to make assumptions of latent variables such as radiance, distance or airlight of the object and derive a local optimal solution, but does not derive a global optimal solution to characterize the fine-grained details of transmission and thereby is inaccurate for dehazing.

In comparison, the above embodiments assume that the original radiances of all the pixels within the local window of each pixel are identical in order to derive the transmission of each of the pixels and the transmission map with the global optimal solution, and thereby recover the image with the accurate transmission map. In addition, a transmission heuristic of the captured image can be obtained before calculating the corresponding transmission of each pixel in the captured image constrained by the transmission heuristic. Moreover, the corresponding transmission of each pixel can be calculated by assuming that the transmissions of different color channels have different attenuation coefficients.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image recovery method for eliminating an effect of an environmental medium, comprising:
  receiving a captured image affected by the environmental medium;
  defining a respective local window with each pixel located at a center of the respective local window; and
  under an assumption that original radiance of all pixels within the respective local window are identical, performing a minimization estimation for each local window, to obtain a corresponding transmission of each pixel in the captured image;
  wherein the step of performing the minimization calculation for the each local window comprises:
    obtaining radiance of the captured image and the environmental medium, and a mathematical model of original radiance of each pixel without the effect of the environmental medium and the transmission;
    defining a cost function by assuming that original radiance of all pixels within the respective local window in the captured image are identical in the mathematical model;
    calculating the transmission and the original radiance that minimizes the cost function; and
    obtaining a transmission heuristic of the captured image, to guide the transmission by utilizing the transmission heuristic in the step of calculating the transmission and the original radiance that minimizes the cost function;
  wherein the step of utilizing the transmission heuristic to guide the transmission comprises:
    taking a greater value from an estimated result of performing the minimization estimation for each local window and a transmission value of each corresponding pixel in the transmission heuristic as the transmission of each corresponding pixel in the captured image.

2. The image recovery method of claim 1 further comprising:
  deriving original radiance of each pixel without the effect of the environmental medium according to the captured image and the corresponding transmission of the each pixel.

3. The image recovery method of claim 1, wherein the captured image comprises a direct attenuation component and an airlight component in the mathematical model, wherein the direct attenuation component is determined by the transmission and the original radiance of each pixel without the effect of the environmental medium, and the airlight component is determined by radiance of the environmental medium and the transmission.

4. The image recovery method of claim 1, wherein the step of obtaining the cost function further comprises:
  adding a regularization parameter into the cost function, to prevent a capturing function from being an extreme value, wherein the capturing function is determined by the original radiance and radiance of the environmental medium.

5. The image recovery method of claim 1, wherein the step of obtaining the cost function further comprises:
  locally smoothing the transmission.

6. The image recovery method of claim 5, wherein the step of locally smoothing the transmission comprises:
  defining a smooth function according to a smooth parameter and the transmission, wherein the smooth parameter is defined by a degree of local smoothness of the transmission; and
  adding the smooth function to the cost function.

7. The image recovery method of claim 1, wherein the step of obtaining the transmission heuristic of the captured image comprises:
  obtaining a horizon line in the captured image; and
  setting the transmission heuristic of non-ground part in the captured image as a first fixed value according to the horizon line, and setting the transmission heuristic of ground part in the captured image from far to near as a value from the first fixed value to a second fixed value according to the horizon line.

8. The image recovery method of claim 1, wherein the constraints of the transmission comprise: setting the transmission value in the captured image from far to near as a value with logarithmic increase.

9. The image recovery method of claim 1, wherein the constraints of the transmission comprise: setting the transmission heuristic of the same object in the captured image as a value less than or equal to a transmission value at a lowest point of the object.

10. The image recovery method of claim 1, wherein the step of calculating the transmission and the original radiance that minimizes the cost function is performed under a constraint that the original radiance is not a negative value.

11. The image recovery method of claim 1 further comprising:
  obtaining a transmission heuristic of the captured image, to guide the transmission by utilizing the transmission heuristic in the step of performing the minimization estimation for each local window.

12. The image recovery method of claim 11, wherein the step of obtaining the transmission heuristic of the captured image comprises:
  obtaining a horizon line in the captured image; and
  setting the transmission heuristic of non-ground part in the captured image as a first fixed value according to the horizon line, and setting the transmission heuristic of ground part in the captured image from far to near as a value from the first fixed value to a second fixed value according to the horizon line.

13. The image recovery method of claim 1 further comprising: setting different attenuation coefficients for the transmissions of different color channels.

14. The image recovery method of claim 13, wherein the step of setting different attenuation coefficients for different color channels of the transmission comprises:
  setting attenuation coefficients of a red color channel, a green color channel and a blue color channel as values substantially equal to 0.83, 0.93 and 0.95, respectively.

* * * * *